United States Patent
Delaney, Jr. et al.

(10) Patent No.: US 10,498,616 B1
(45) Date of Patent: Dec. 3, 2019

(54) SYSTEM AND METHOD FOR IMPLEMENTING A CLIENT PERFORMANCE CAPTURE TOOL

(71) Applicant: JPMorgan Chase Bank, N.A., NY, NY (US)

(72) Inventors: Raymond P. Delaney, Jr., Newark, DE (US); Robert C. Schieber, Lewis Center, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 128 days.

(21) Appl. No.: 15/272,563

(22) Filed: Sep. 22, 2016

(51) Int. Cl.
  *H04L 29/08* (2006.01)
  *H04L 12/26* (2006.01)
  *G06F 9/44* (2018.01)

(52) U.S. Cl.
  CPC .......... *H04L 43/065* (2013.01); *H04L 43/045* (2013.01); *H04L 67/02* (2013.01); *G06F 9/44* (2013.01); *H04L 29/08099* (2013.01)

(58) Field of Classification Search
  None
  See application file for complete search history.

(56) References Cited

U.S. PATENT DOCUMENTS

| | | | | |
|---|---|---|---|---|
| 6,751,789 B1* | 6/2004 | Berry | ........... | G06F 11/3466 714/35 |
| 2012/0266074 A1* | 10/2012 | Bhoovaraghavan | .... | G06F 11/32 715/738 |
| 2013/0227078 A1* | 8/2013 | Wei | ........... | H04L 67/2814 709/219 |
| 2013/0275579 A1* | 10/2013 | Hernandez | ........... | H04L 67/22 709/224 |
| 2014/0245070 A1* | 8/2014 | Rumble | ........... | G06F 11/3692 714/38.14 |
| 2015/0169434 A1* | 6/2015 | De Angelis | ........... | G06F 11/3688 717/126 |
| 2015/0237063 A1* | 8/2015 | Cotton | ........... | H04L 63/1433 726/25 |

* cited by examiner

*Primary Examiner* — James A Edwards
(74) *Attorney, Agent, or Firm* — Hunton Andrews Kurth LLP

(57) ABSTRACT

The invention relates to a capture tool that remotely captures client-side performance data comprising: an interactive interface that receives user input; a computer processor, coupled to a memory component and the interactive interface, programmed to: receive, via a command line interface, a test command that comprises a path to a test script; launch, via a test runner component, a browser, at a remote client device, to execute a test in response to the test command; capture trace data from the browser launching at the remote client device; save the trace data at a local storage as snapshot files; and generate, via the interactive interface, performance data based on the trace data.

18 Claims, 4 Drawing Sheets

SYSTEM AND METHOD FOR IMPLEMENTING A CLIENT PERFORMANCE CAPTURE TOOL

FIELD OF THE INVENTION

The invention relates generally to a system and method for capturing web client performance, and more particularly to a client capture tool that collects data from an application executing on a client device and provides performance analysis of the application.

BACKGROUND OF THE INVENTION

Over the last few years, there has been a paradigm shift in the way web applications are built. Applications have gone from thin-client and fat-server to heavy feature based fat-clients due to a demand for mobile ready, responsive web applications. However, performance testing landscape has not kept up with these changes. Benchmarking web application performance has historically been server-oriented. The approach has typically been to throttle load by adding simulated or synthetic clients while at the same time measuring network and HTTP level statistics, such as "time to first byte" or latency. The server-oriented approach does not adapt well for fat-client type applications. Time to first byte and network level captures do little to predict rendering, loading, Javascript execution and other problems which can lead to a poor client experience. Most browsers today provide development tools which allow developers to inspect the application on their computer. However, inspection at this level is limited to debugging and is not well suited for reporting and benchmarking. As a result, companies and developers are simply unable to properly validate how their code is running at the client side. Current methodologies require developers to conduct time-consuming searches looking for performance anomalies.

These and other drawbacks currently exist.

SUMMARY OF THE INVENTION

According to one embodiment, the invention relates to a computer implemented system that remotely captures client-side performance data. The capture tool comprises: an interactive interface that receives user input; a computer processor, coupled to a memory component and the interactive interface, programmed to: receive, via a command line interface, a test command that comprises a location or a path to a test script; launch, via a test runner component, a browser, at a remote client device, to execute a test in response to the test command; capture trace data from the browser launching at the remote client device; save the trace data at a local storage or files as snapshot files; and generate, via the interactive interface, performance data based on the trace data.

The capture tool may include a specially programmed computer system comprising one or more computer processors, mobile devices, electronic storage devices, and networks.

The invention also relates to computer implemented method that implements a capture tool that remotely captures client-side performance data. The method comprises the steps of: receiving, via a command line interface, a test command that comprises a location or a path to a test script; launching, via a test runner component, a browser, at a remote client device, to execute a test in response to the test command; capturing trace data from the browser launching at the remote client device; saving the trace data at a local storage or files as snapshot files; and generating, via the interactive interface, performance data based on the trace data.

The computer implemented system, method and medium described herein provide unique advantages to various industries and users, according to various embodiments of the invention. The innovative system and method facilitates the ability to effectively and efficiently collect data and provide the data in a usable format for performance analytics. Current systems require that the user actually knows of a problem and then is required to further gather information relating to that problem through a debugging process. The novel system enables efficient collection of remote client data and facilitates accurate and real-time performance analytics to better address performance and other issues. Other advantages include enhanced software and other performance as well as increased satisfaction of customers and other users. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
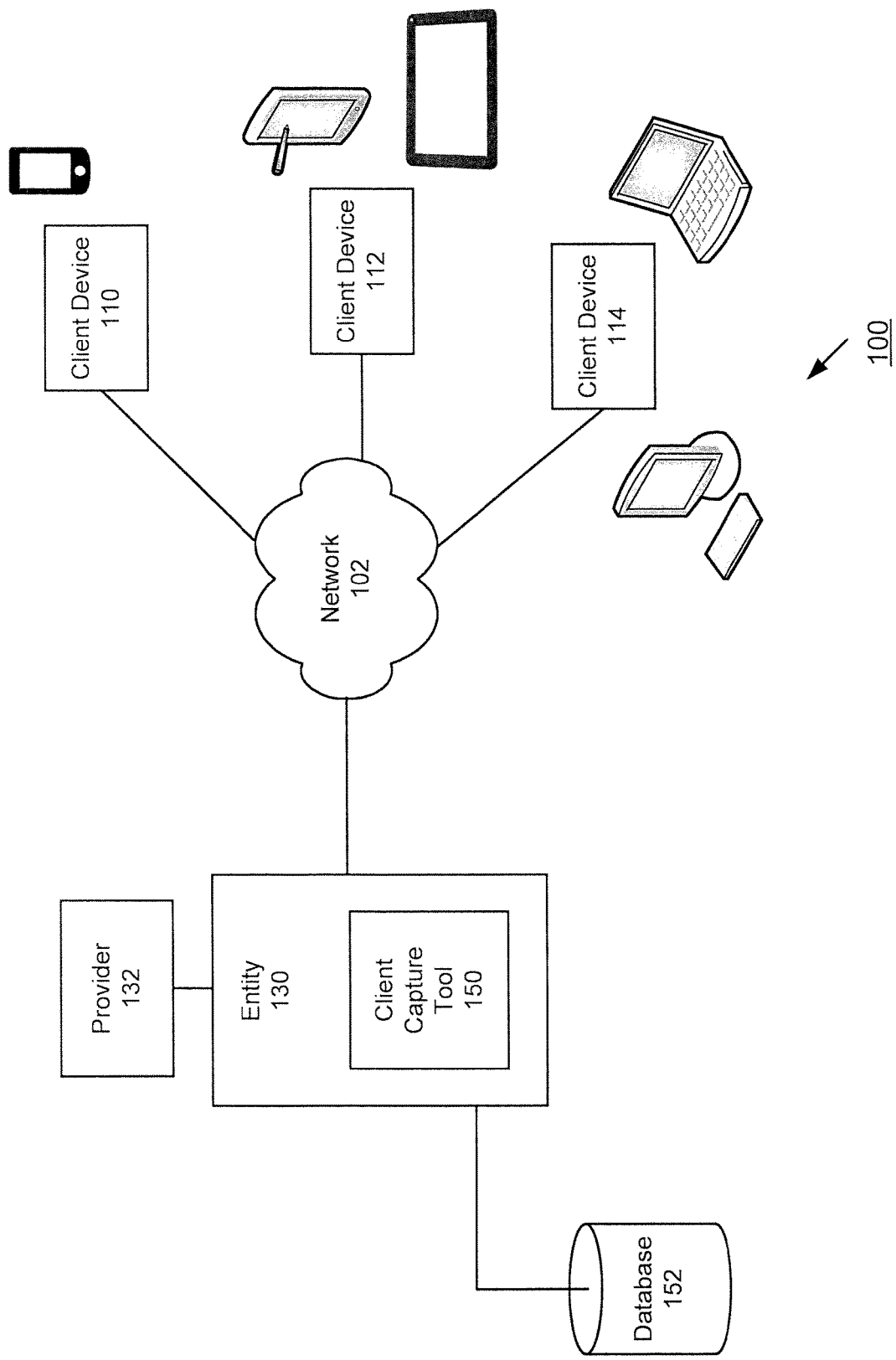
FIG. 1 illustrates a schematic diagram of a system that implements a web client performance capture tool, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an innovative tool that captures and persists client-side benchmarking measurements. For example, the tool captures, saves and manages key client side performance metrics including memory, rendering and script execution, for example. Key client side indicators may then to be used to detect various problems, such as performance regression, as well as events, trends and predictive analysis.

According to an exemplary embodiment, the innovative tool captures trace data, imports the data into SQL-based snapshot files, and then accesses the data via a reporting layer to analyze, interpret and further act upon the data.

An embodiment of the present invention may include automated performance regression checks in a software development lifecycle. For example, an embodiment of the present invention may be triggered by a developer checking in or modifying code. A source control system may trigger the system, which may look for regressions in performance or other areas after running a comparison to previous runs. The client capture tool effectively and efficiently detects root causes of performance problems.

According to an embodiment of the present invention, a user may create a new test. The test may include a set of automated actions that a browser completes. According to an exemplary implementation, the browser's actions may be scripted and controlled through a third party product, such as a wrapper that simplifies low level development tools and/or wire protocol. Other tools for automating the browser may be implemented. In addition, a user may write a test as well. Trace data may be imported into a database, such as a SQLite database that resides on a file system. In addition, the client capture tool may automate taking a snapshot on each commit and also comparing with previous commits. The capture tool may also automate production snapshots. The client capture tool may be hosted locally off developer machines but may also be deployed as a dedicated service. The capture tool may implement a decision pipeline that determines when certain performance metrics are met or not being met, e.g., when degradation is occurring, where the problem code is, reporting at many different levels, etc.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

FIG. 1 illustrates a schematic diagram of a system that implements a web client performance capture tool, according to an exemplary embodiment. As illustrated, network 102 may be communicatively coupled with one or more data devices including, for example, computing devices associated with Client Devices 110, 112 and 114. Such devices may include mobile devices, including mobile phones, smart devices, etc. Network 102 may communicate with various entities, as represented by Entity 130. Entity 130 may include a Client Capture Tool 150 that facilitates capturing of remote client performance data. Database 152 may store trace data, performance data, client device data, etc. The client data capture features described herein may be provided by Entity 130 and/or a third party provider, represented by 132, where Provider 132 may operate with Entity 130. Entity 130 may include a web server, web API, browser and/or other software application for retrieving, presenting, and traversing information. For example, a client device may communication with Client Capture Tool 150 via HTTP, or other application protocol. Client Capture Tool 150 may capture and process client performance data, according to an exemplary embodiment of the present invention. According to an exemplary application, Entity 130 may represent a financial institution.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

Transport may be intercepted by an embedded proxy, which may be part of an embodiment of the present invention. This proxy may be used by an embodiment of the present invention to modify traffic in a way that adds additional data to tracefiles. For example, an embodiment of the present invention may be used to add breakpoints and/or additional instrumentation and logging around a specific javascript call and/or network request. Also, certain responses may be tampered with and/or changed so a user may evaluate how a target application handles certain conditions.

While FIG. 1 illustrates individual devices or components, it should be appreciated that there may be several of such devices to carry out the various exemplary embodiments. Client Devices 110, 112 and 114 may represent any mobile or computing device, such as a laptop computer, a personal digital assistant, a smartphone, a smartwatch, smart glasses, other wearables or other computing devices capable of sending or receiving network signals. Client Devices 110, 112 and 114 may have an application installed that is associated with Entity 130, for example.

Entity 130 may be communicatively coupled to Database 152. For example, Database 152 may store trace data, performance data, analytics, etc. Database 152 may include any suitable data structure to maintain the information and allow access and retrieval of the information. For example, Database 152 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein. Database 152 may also represent cloud storage or other hosted/pooled storage providers and/or services.

Database 152 may be any suitable storage device or devices. The storage may be local, remote, or a combination thereof with respect to Database 152. Database 152 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Database 152 may have back-up capability built-in. Communications with Database 152 may be over a network, such as network 102, or communications may involve a direct connection between Database 152 and Entity 130, as depicted in FIG. 1. Database 152 may also represent cloud or other network based storage.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 2:
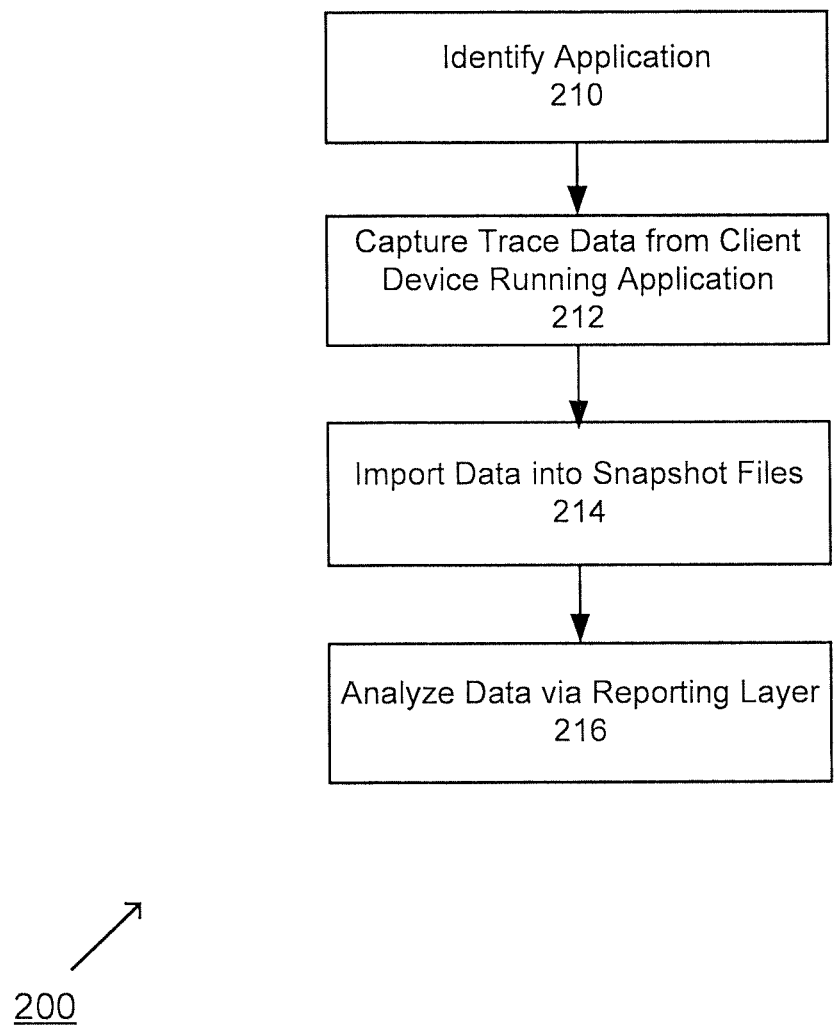
FIG. 2 is an exemplary flowchart of a method for web client performance capture, according to an embodiment of the present invention.

FIG. 2 is an exemplary flowchart of a method for web client performance capture, according to an embodiment of the present invention. At step 210, a client capture tool may identify an application executing on a remote client device. At step 212, the client capture tool may capture trace data from the remote client device. At step 214, data may be imported into files, such as snapshot files. At step 216, the data may be analyzed via various reporting functions. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a client capture tool may identify an application executing on a remote client device. An embodiment of the present invention is directed to viewing applications from the vantage point of the client device. The remote client device may include a smartphone, desktop device, wearable, mobile device, laptop, smart device, personal assistant device, etc. The remote client device may include an operating system (OS) and/or other system software that manages computer resources. The end user device may also include a browser or other software application that retrieves, presents, and traverses information resources on a website or other source. For example, the client capture tool may run across various operating systems, including Windows, MAC OS, as well as mobile devices. The end user device may include various applications, software and other code that executes end user and other programs. The client capture tool may also work within multiple browsers, such as Chrome, Safari, Firefox, IE, Edge, Opera+ options for others.

At step 212, the client capture tool may capture trace data from the remote client device. Trace data may represent a log of instructions executed on a client device. For example, trace data may include information about data that is read from and written to memory and other information that provides a comprehensive view of what the client device is doing as an application is running. Trace data may also demonstrate interactions between various tasks and interrupts. Trace data also provides performance and profiling information. For example, trace data may indicate how much processor time each part of a system or client device uses.

The client capture tool may run natively within a browser or operating system and data may be automatically gathered by launching a test, for example. In addition, the client capture tool may run on virtual and physical machines. As for bandwidth and latency, the capture tool may launch tests under different network bandwidths. The client capture tool may also launch tests under different latencies, for example. The client capture tool provides various testing options, including automated, ad hoc, structured, and stress testing options. The client capture tool may also identify versioning data, in particular, versioning and automatic identification of release, version, and tree.

The client capture tool may record data in various intervals or increments. For example, the capture tool may record data over short (e.g., 1 minute) and long (e.g., 72 hours) test windows. Also, the capture tool may record data in x (1-5) second intervals. The capture tool may create recordings of what is seen within the test. The capture tool may also provide snap shot capability as well as tie test and recording into a tracking product or service automatically if failure/error detected. For example, the capture tool may record into JIRA or other tracking product that provides bud tracking, issue tracking, project management functions and/or other functions. The client capture tool may be trained with supervised learning to determine and identify performance regressions, setbacks and/or other indicators. For example, if regressions are discovered, the client capture tool may provide an interface which notifies subscribers of its findings. Also, JIRA, or a different subscriber may send an email or flag the build as failing. Other subscribers may invoke jobs based on the performance regression failure.

When an application runs within a browser, the client capture tool may capture elements of the browser as it is building. Other elements that may be captured may include: JavaScript time, execution, memory use; page load; page components; breakdown of methods/patterns/components within code; memory; central processing unit (CPU); heap; garbage collection; memory comparison over time (initial, resting, running); assets downloaded (e.g., all; broken by type; broken by size; total size; total time to download, etc.); painting/animation frames; cascading style sheets (CSS) rendering; document object model (DOM) rendering/action, etc.

According to another example, when an application runs within a native device, the client capture tool may capture elements of the application as it is building. Other elements that may be captured may include: battery; memory; CPU; breakdown of methods, patterns, and/or components within code; load time; elements/data calls; memory comparison over time (initial, resting, running); etc. The client capture tool may also run similar tests from virtual agents for reporting and/or other purposes.

The capture tool does not require new code to be added into the programs. These platforms should be able to have this software already within the server, operating system and/or browser to grab the necessary information.

At step 214, data may be imported into files, such as snapshot files. A snapshot represents the state of a system at a particular point in time. A snapshot captures the state of the client device. A snapshot file may include details regarding a current state of a client device. The data may be imported into other file or data formats.

At step 216, the data may be analyzed via various reporting functions. The capture tool may query the data collected. For example, an embodiment of the present invention may provide an ability to dashboard the data release over release as well as overall operating system CPU, memory, usage, etc. For example, an exemplary dashboard may provide various views, including an Executive view (e.g., summary of information), Developer view (e.g., detailed view for each release that developers can dig into items) as well as other views.

An Ad hoc reporting function may provide an ability to create ad hoc reports on custom data. Also, the reporting function may provide an ability to deep dive into detailed data collected for release by developers.

An embodiment of the present invention may provide administration features, including an ability to push configurations and make changes to software remotely; ability to detect and alert if there is an issue within the system that will not collect, etc.

Figure 3:
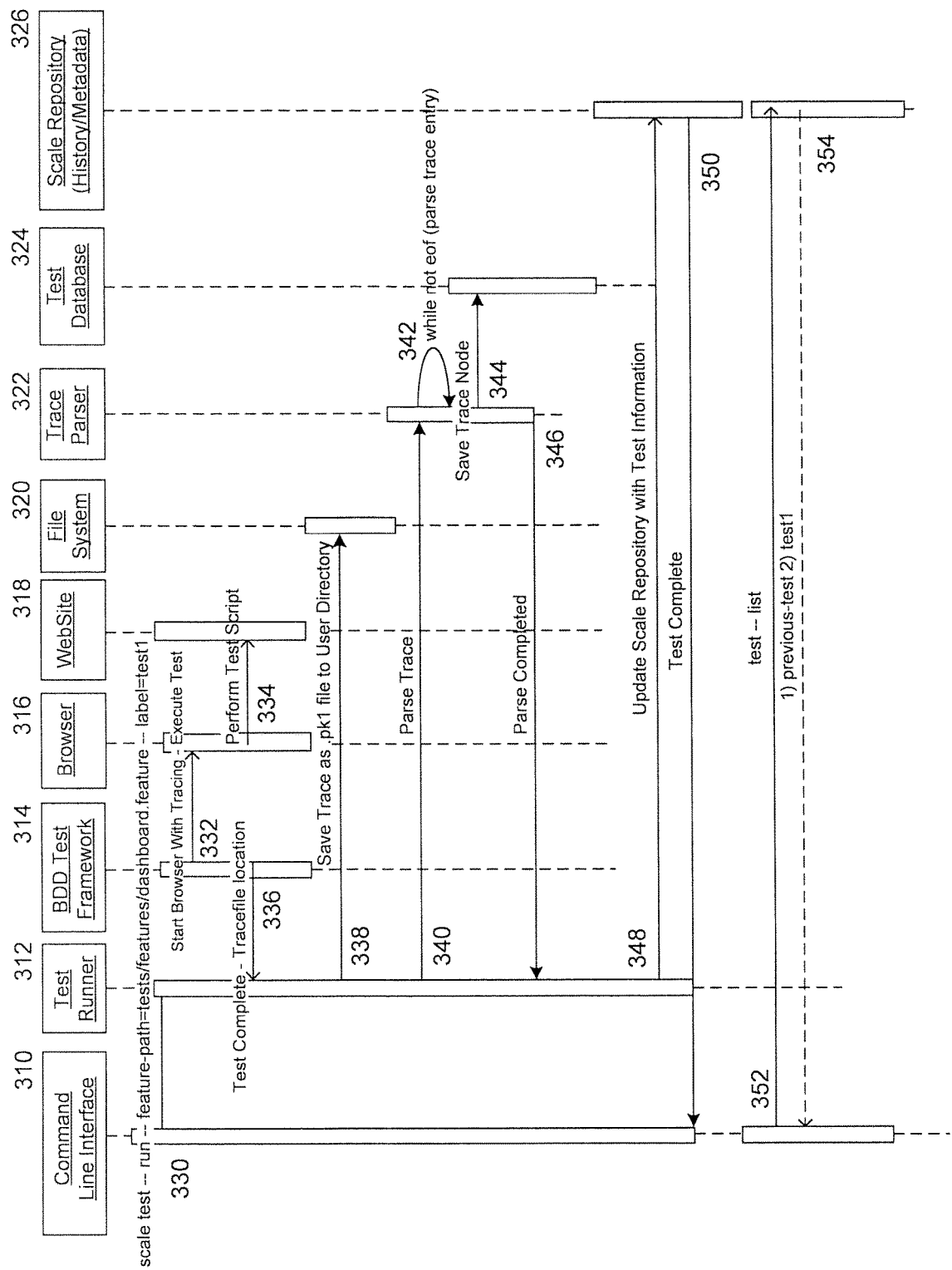
FIG. 3 is an exemplary flow diagram that illustrates a web client performance capture, according to an embodiment of the present invention.

FIG. 3 is an exemplary flow diagram that illustrates a web client performance capture, according to an embodiment of the present invention. A client capture tool of an embodiment of the present invention is directed to capturing data from a remote client device. For example, the client capture tool launches a browser at the remote client device and once the browser launches, the client capture tool encapsulates tasks that the browser is running and executing. Notably, the client capture tool is directed to capturing data at the client device, not the server side.

As shown in FIG. 3, a user may input a command at 330 to run a test, via CLI 310. In this example, a user may initiate a test using a command "scale test" followed by a path to a feature file, e.g., "feature-path=tests/features/dashboard.feature" followed by a label and name, e.g., "label=test1."

Command Line Interface (CLI) 310 enables a user to interact with a computer program by issuing commands using lines of text, i.e., command lines. CLI 310 provides a mechanism for sending inputs to the client capture tool. CLI 310 may interact with internal components to perform various actions. Exemplary commands may include: "config" to initialize a repository; "datasource" to add a datasource; "db" to open a test in a SQLite database viewer; "load" to load a trace file; and "test" to create and run labeled tests. Other commands may be implemented to execute various tasks and obtain other performance data and metric.

Browser 316 may be launched to execute the test, as shown by 332. Browser 316 may represent any type of browser or other application running on a client device. For example, Browser 316 may launch and interact with Website 318 or other target application. Browser 316 may perform a test script, as shown by 334. For example, Browser 316 may run an automated test and collect data about the client device's performance.

Also, behavior driven development (BDD) Test Framework 314 may complete the test and identify a tracefile location, as shown by 336. BDD may use high level and non-technical language to write tests. Also, hooks may be tied to certain keywords. Thus, according to an embodiment of the present invention, tests may be easy to read and write. A client capture tool may or may not be coupled with a specific test implementation. For example, the client capture tool may be used with TDD—a BDD counterpart. The test phase may represent a script or set of commands which makes the browser perform the same (or similar) actions in the same (or similar) way. The artifact of the test may be represented as tracefile which may be left behind and parsed/processed by an embodiment of the present invention.

Test Runner 312 may save trace data to a user directory in File System 320, as shown by 338. For example, the performance data may be stored in a snapshot file and saved locally. The data may also be captured and/or recorded by other methodologies. File System 320 may maintain various files, including scale.cfg; scale.db, etc. Test Runner 312 may parse the trace data, as shown by 340.

Test Runner 312 may schedule a new test, initialize metadata, observe test runs and updates metadata. For example, an underlying test may currently use a Behavior Driven Test framework, but the actual test framework may be interchangeable. Test Runner 312 may also launch a Browser 316 with tracing configuration data. When the test completes, Test Runner 312 may export a tracefile to an isolated location on a File System. Test Runner 312 may also invoke Trace Parser 322, passing the path of the tracefile.

Trace Parser 322 may parse data, as shown by 342. Step 342 may execute a parse function for each line starting at the beginning and executing until an end of file (eof) is reached. Trace Parser 322 may use a visitor pattern to traverse each tracelog entry. For each tracelog node, Trace Parser 322 may invoke correct parser and write to test level database. For example, trace data may be a large JavaScript Object Notion (JSON) array with 100,000 or more records in JSON format. Other data formats may be implemented. Each record may have several attributes, such as timestamp, name of event, event message, relevant arguments and context information. Events may be immediate type events where something is starting or ending. Events such as these may include two records—a begin record and an end record, for example. Other records may be complete records which have duration and other attributes. A trace loader may load the event queue in memory and parses events in a LIFO or other fashion. The trace loader may pass each record to a "TraceVisitor" abstraction, for example, which may parse each record by instantiating a specific subclass based on the type of record it is dealing with. For example, if a "functioncall" record is encountered, the TraceVisitor may call a method called "VisitFunctionCall" and pass the record. "VisitFunctioncall" may then save the record to the snapshot database or other storage.

Trace Parser 322 may save trace node at Test Database 324, as shown by 344. For example, this may involve a ParseHTML event. For example, a parse tree may use a software pattern called "visitor." Other software patterns may be used. In this exemplary pattern, each record type may represent a leaf on a tree. The Visitor walks up and down the tree and invokes a correct leaf node parser. Depending on the number of record times, there may be many different visit implementations. For example, a "visit_functioncall" method would be required to parse a "FunctionCall" node or event. A "visit_SendXHR" may be built to parse an XEIR (xmlhttprequest) node. The parse may be completed, as shown by 346. Test Result/Snapshot Database 324 may be implemented in SQLite or other library or file structure. For example, a new snapshot may be created for each new test run, this may contain the parsed trace data.

Test Runner 312 may update Scale Repository 326 with test information, as shown by 348. Scale Repository 326 may represent a centralized Global/Application level database that holds metadata for test-runs, labels, etc. Scale Repository 326 may hold global data, locations, references and/or labels to snapshots and tracefiles. Test complete notification may be returned to CLI 310, as shown by 350. A test-list command may be initiated at CLI 310 to Scale Repository 326, as shown by 352. Scale Repository 326 may return results to CLI 310, as shown by 354. For example, test results from a previous test and the current test, e.g., test1, may be provided to CLI 310.

Figure 4:
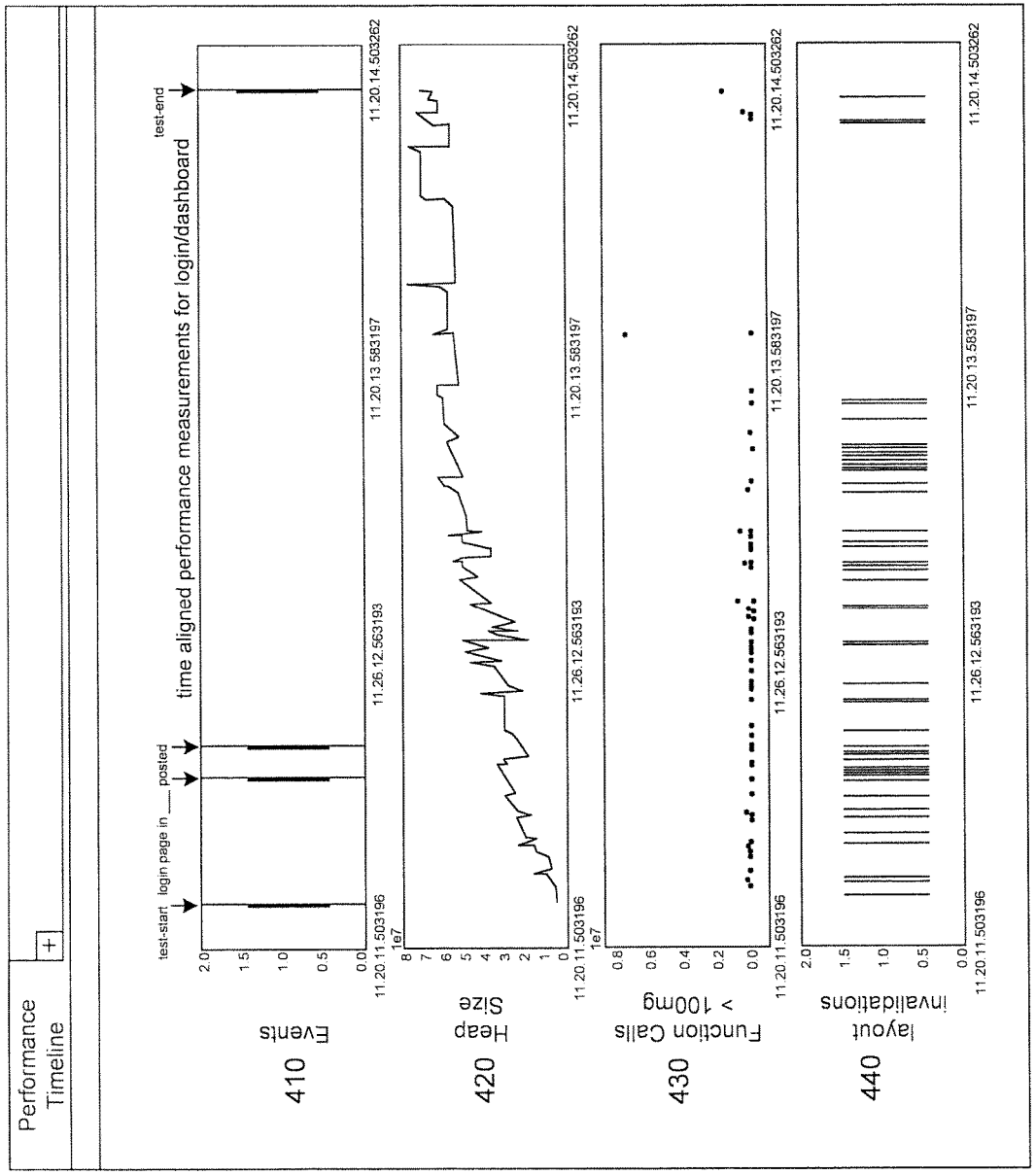
FIG. 4 is an exemplary screen shot that illustrates a web client performance capture, according to an embodiment of the present invention.

FIG. 4 is an exemplary screen shot that illustrates a web client performance capture, according to an embodiment of the present invention. The client capture tool may provide an interactive user interface that displays the data collected in a useable format. For example, the user interface may provide performance data, such as memory usage and performance. In the example shown in FIG. 4, the interface provides a performance timeline. Other types of timelines may also include memory usage, Javascript engine events—compile, deoptimizations, execution times, parse times, call counts, Rendering Events—paints, tree invalidations, reflows, animations, network requests, garbage collections, timers, GPU related such as framerate, node counts, event dispatches, and custom events that we create through script injection or proxy modification during the test.

FIG. 4 illustrates various performance metrics. Section 410 illustrates time aligned performance measurements for login/dashboard. Section 410 illustrates a test start time and a test end time. Posted time events may also be captured.

FIG. 4 also illustrates Heap Size as shown in Section 420, Function Calls as shown in Section 430 and Layout Invalidations as shown in Section 440. For example, heap size may represent the amount of memory used by various objects. Other forms of memory measurement may be captured and provided. Performance data may provide additional insights into the application's execution and operation. For example, a high number or volume of function calls may provide insight and performance analysis into a particular application. Also, layout invalidations may provide insights into website performance and other display metrics.

According to another example, a particular report may be specific for a particular day or timeframe. The system may compare one snapshot to another snapshot, as well as data collected on different dates or timeframes.

The interactive user interface of an embodiment of the present invention enables a user to view performance and other data and further perform analytics based on the collected data. A reporting feature of the invention provides comprehensive performance analytics. Current systems require that the user actually knows of a problem and then is required to further gather information relating to that problem through a debugging process.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the Client Devices 110, 112, 114 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (Paas), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented capture tool that remotely captures client-side performance data, the computer implemented capture tool comprising:
    an interactive interface that receives user input;
    a computer processor, coupled to a memory component and the interactive interface, programmed to:
    receive, via a command line interface, a test command that comprises a path to a test script;
    launch, via a test runner component, a browser, at a remote client device, to execute a test in response to the test command;
    capture trace data and performance data from the browser launching at the remote client device, wherein the trace data comprises information regarding data that is read from and written to memory and the performance data comprises one or more of memory usage, rendering and script execution;
    save, via a local storage, the trace data and performance data as a snapshot file;
    parse, using a trace parser, the trace data based on a plurality of record subclasses;
    save, in a database different from the local storage, the parsed trace data to represent a parse tree structure; and
    generate, via the interactive interface, performance metrics responsive to the parsed trace data and performance data, wherein the interactive user interface displays a plurality of performance timelines.

2. The tool of claim 1, wherein the browser interacts with a website.

3. The tool of claim 1, wherein the trace data is further parsed by a trace parser.

4. The tool of claim 1, wherein the test runner component initializes and updates metadata.

5. The tool of claim 1, wherein the browser is launched with a tracing configuration.

6. The tool of claim 1, wherein the local storage comprises a SQLite database.

7. The tool of claim 1, wherein the performance timeline comprises a snapshot of data at a predetermined time.

8. The tool of claim 1, wherein the interactive user interface compares a first snapshot to a second snapshot.

9. The tool of claim 1, wherein the interactive user interface provides ad hoc reporting to create custom reports.

10. A computer implemented method of implementing a capture tool that remotely captures client-side performance data, the method comprising steps of:
    receiving, via a command line interface, a test command that comprises a path to a test script;
    launching, via a test runner component, a browser, at a remote client device, to execute a test in response to the test command;
    capturing trace data and performance data from the browser launching at the remote client device, wherein the trace data comprises information regarding data that is read from and written to memory and the performance data comprises one or more of memory usage, rendering and script execution;

saving, via a local storage, the trace data and performance data as a snapshot file;
parsing, using a trace parser, the trace data based on a plurality of record subclasses;
saving, in a database different from the local storage, the parsed trace data to represent a parse tree structure; and
generating, via an interactive interface, performance metrics responsive to the parsed trace data and performance data, wherein the interactive user interface displays a plurality of performance timelines.

11. The method of claim 10, wherein the browser interacts with a website.

12. The method of claim 10, wherein the trace data is further parsed by a trace parser.

13. The method of claim 10, wherein the test runner component initializes and updates metadata.

14. The method of claim 10, wherein the browser is launched with a tracing configuration.

15. The method of claim 10, wherein the local storage comprises a SQLite database.

16. The method of claim 10, wherein the performance timeline comprises a snapshot of data at a predetermined time.

17. The method of claim 10, wherein the interactive user interface compares a first snapshot to a second snapshot.

18. The method of claim 10, wherein the interactive user interface provides ad hoc reporting to create custom reports.

* * * * *